June 5, 1945.  W. A. RAY  2,377,516
THERMOELECTRIC GENERATING SYSTEM
Original Filed Jan. 13, 1941
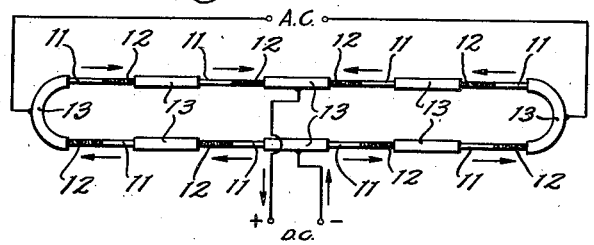
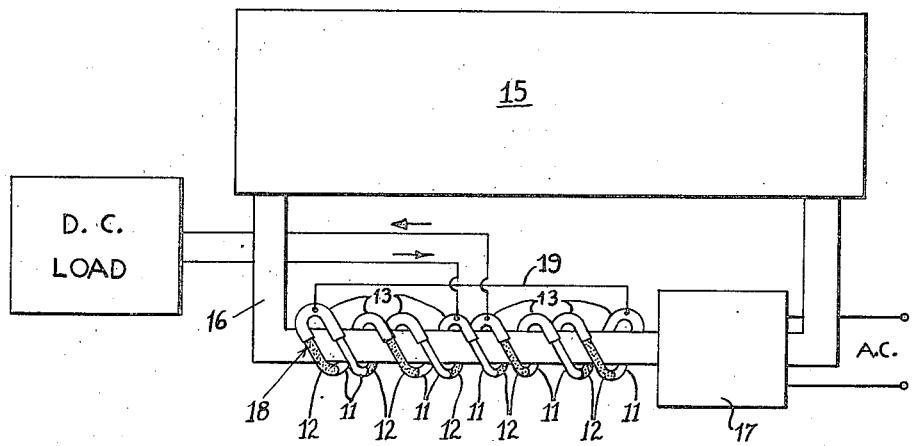
Inventor,
WILLIAM A. RAY
By John H. Rouse,
Attorney Patented June 5, 1945

2,377,516

UNITED STATES PATENT OFFICE 2,377,516

THERMOELECTRIC GENERATING SYSTEM

William A. Ray, Los Angeles, Calif.

Original application January 13, 1941, Serial No. 374,303, now Patent No. 2,288,300, dated June 30, 1942. Divided and this application May 19, 1942, Serial No. 443,608

1 Claim. (Cl. 136—4)

This invention relates to control systems which include thermoelectric generating means, the present application being a division of my copending application, Serial No. 374,303, filed January 13, 1941; now Patent No. 2,288,300, dated June 30, 1942.

In some control systems, a source of direct current at very low voltage is desirable, one of the advantages of the use of such current being the substantial elimination of arcing at contacts for controlling the current, so that condition responsive control devices of the simple "floating" or non-snap-action type may be employed; further advantages being pointed out in my U. S. Patent No. 2,274,938 for Control circuit. It is therefore an object of this invention to provide means for generating such energy thermoelectrically and as an incident to the energization of an ordinary electrically operated device, such as a motor, relay or the like; or, more specifically, the provision of a thermoelectric device so arranged as to be influenced to generate electricity by the passage of current through the coil winding of such an ordinary electrically operated device.

Another object is the provision of thermoelectric means constructed and arranged to be influenced to generate electricity by the flux produced by alternating current flow in an ordinary electrically operated device.

One of the inherent advantages of this invention resides in the fact that, by so arranging the thermoelectric means, the generation of thermoelectricity ceases when the electrically operated device with which it is associated is unenergized; the load normally energized by the thermoelectricity then being restored to an unenergized "safe" condition.

Other objects and advantages of the invention will be found in the description, the drawing and the appended claim; and for complete understanding of the invention reference may be had to the following detailed description and accompanying drawing, wherein:

Figure 1 is a diagrammatic view of one form of thermoelectric device which is adapted for use in the system of my invention; and Figure 2 is a diagram of a system according to my invention wherein the device shown in Fig. 1 is employed.

Referring first to Fig. 1, the thermocouple "ring" or "bridge" shown therein comprises a plurality of pairs of thermocouple elements 11 and 12, of dissimilar metals or alloys, interconnected at their "cold junction" ends by relatively massive elements 13 of metal having high heat conductivity and low electrical resistance, such as copper. If a source of alternating current is connected to points of the ring about which the numbers of pairs of thermocouple elements are equally arranged, the alternating current passes equally through the parallel branches of the ring and thus heats the thermocouple elements 11 and 12 which offer considerably greater resistance to current flow, on account of their smaller size and greater specific resistance, than do the copper elements 13. The elements 11 and 12 may preferably be of such alloys as "Copel" and "Chromel," respectively. The adjoining ends, or hot junctions, of elements 11 and 12 are thus at a higher temperature than the opposite, or cold junction, ends of these elements which are connected to the relatively cool copper elements 13, and consequently current is generated which tends to flow in the direction of the arrows, element 12 of "Chromel" being thermoelectrically positive. Connections for utilizing the generated direct current are made to the ring at opposite points of the branches equally spaced from the points at which the alternating current is connected. The direct current connection points thus being at equal alternating potential, no alternating current can flow in the direct current leads. The groups of series-connected thermocouples on opposite sides of the direct current connection points are in opposed relation and therefore no direct current flows in the ring until a load is connected to the direct current output leads, whereupon the generated current flows equally through the right and left hand portions of the ring, as indicated by the arrows. Any even number of pairs of thermocouples may be provided in these portions as long as the proper alternating curernt and direct current balances are maintained.

In Fig. 2, the numeral 15 indicates an ordinary A. C. operated device, such as a motor or relay, having a core 16 and an energizing coil winding 17 around one portion thereof. Around another portion of the core is a winding 18 consisting of a thermocouple ring similar to that shown in Fig. 1. In this arrangement, the alternating current for heating the thermo-junctions, instead of being supplied directly to the ring, is electromagnetically induced therein by the alternating flux produced in the core. The parallel sections of the ring shown in Fig. 1 form a double winding around the core so that there is the same balanced A. C. effect with respect to the D. C. connections as in Fig. 1. The wire 19 corresponds to the A. C. supply leads of Fig. 1 and is connected to the same points of the ring as are those leads. The E. M. F. induced in both sections of the double winding 18 is always the same in direction and magnitude and hence A. C. flows through both of these sections, in parallel, in series with wire 19; the A. C. circuit thus being effectively the same as in Fig. 1. The D. C. load is connected to the mid-points of the winding sections, which mid-points are constantly at the same alternating potential due to the equal distribution of electrical resistance at opposite sides of the mid-points, and hence no A. C. can flow to the load; further, no D. C. can flow in wire 19 since it is connected at points of the D. C. circuit of equal and opposite potential.

I claim as my invention:

In a thermoelectric generating system: an electromagnetic device, adapted to be operated by alternating current, comprising a core and a coil for energizing the same; a pair of windings around said core and joined together in parallel at their respective ends, and separate conducting means interconnecting said ends; said windings being so arranged that, when said core is energized, alternating current is induced constantly in the same direction and magnitude in each of the parallel windings; a pair of thermocouples connected in series in each of said windings, one thermocouple at either side of the mid-point of the winding, the individual thermocouples of each pair being in opposed relation to each other; each of said thermocouples comprising a pair of dissimilar elements joined together at one end to form a "hot-junction"; the cross-sectional area of said elements being smaller than that of the portions of the windings to which the other or "cold-junction" ends of the thermocouples are connected, so that the hot-junctions are heated to a higher degree than the cold-junctions by passage of said induced current, and thereby direct current is generated; and electrical connections for said direct current made at said mid-points of the windings; said thermocouples being so oriented that the generated direct current will flow from either side of one of the windings toward its respective mid-point, and toward either side of the other of the windings from its respective mid-point; the distribution of electrical resistance through each of the windings, and the thermocouples therein, being such that said mid-points are constantly at the same alternating potential.

WILLIAM A. RAY.